United States Patent [19]

Kuhne et al.

[11] Patent Number: 4,775,723

[45] Date of Patent: Oct. 4, 1988

[54] METAL CARBOXYLATE DERIVATIVES FOR USE IN SYNTHETIC MATERIALS, EMULSIONS AND SUSPENSIONS

[75] Inventors: Helmut Kuhne, Kreuzau; Karl-Heinz Frassek, Langerwehe; Dieter Sonderhof, Düren; Günther Lanzrath, Merzenich; Fritz Steinseifer, Langerwehe; Heinz Beck, Düren, all of Fed. Rep. of Germany

[73] Assignee: AKZO N.V., Arnhem, Netherlands

[21] Appl. No.: 117,451

[22] Filed: Nov. 4, 1987

Related U.S. Application Data

[63] Continuation of Ser. No. 795,176, Nov. 5, 1985, abandoned.

[30] Foreign Application Priority Data

Nov. 5, 1984 [NL] Netherlands .................. 8403347

[51] Int. Cl.$^4$ ............................................... C08F 8/42
[52] U.S. Cl. ........................... 525/327.7; 525/327.8; 525/329.5; 525/329.6; 525/366; 525/367; 525/368; 525/369
[58] Field of Search ............... 525/327.7, 327.8, 329.5, 525/329.6

[56] References Cited

U.S. PATENT DOCUMENTS

| | | |
|---|---|---|
| 2,977,334 | 3/1961 | Zepf, Jr. et al. ............... 525/327.7 |
| 3,030,342 | 4/1962 | Tiefenthal et al. ............ 525/327.7 |
| 3,741,940 | 6/1973 | Heilman ........................ 525/327.7 |
| 3,943,111 | 3/1976 | Fritze et al. .................. 525/327.7 |
| 4,013,609 | 3/1977 | Hultzsch et al. .............. 525/327.7 |
| 4,036,810 | 7/1977 | Hopkins et al. .............. 260/45.75 W |
| 4,128,185 | 12/1978 | Wszolek ...................... 525/327.7 |
| 4,192,930 | 3/1980 | Beck et al. .................... 525/227 |
| 4,334,038 | 6/1982 | Beck et al. .................... 525/207 |
| 4,482,675 | 11/1984 | Witt ............................. 525/327.7 |

FOREIGN PATENT DOCUMENTS

| | | |
|---|---|---|
| EP54761 | 11/1981 | European Pat. Off. . |
| 2338642 | 3/1975 | Fed. Rep. of Germany . |
| 2727329 | 1/1979 | Fed. Rep. of Germany . |
| 3003797 | 8/1981 | Fed. Rep. of Germany . |
| 3136931 | 4/1983 | Fed. Rep. of Germany . |
| 1426284 | 2/1976 | United Kingdom . |

*Primary Examiner*—Joseph L. Schofer
*Assistant Examiner*—Bernard Lipman
*Attorney, Agent, or Firm*—Parkhurst, Oliff & Berridge

[57] ABSTRACT

The invention relates to metal carboxylate derivatives of partially esterified α-olefin unsaturated polycarboxylic acid copolymers, the α-olefin containing 6 to 40 carbon atoms and the copolymer being esterified with an alcohol. At least 80 percent by weight of the unesterified copolymer has a molecular weight in the range from 1000 to 100,000. Preferably, the α-olefin is maleic anhydride and the alcohol contains 4 to 18 carbon atoms. The present compounds are surprisingly satisfactory internal and external lubricants for synthetic resin as PVC. Furthermore, the present compounds can be used as emulsifying and/or suspending agents, in particular when the alcohol is a polyethylene oxide glycol ether with 1 to 50 ethylene oxide units.

13 Claims, No Drawings

METAL CARBOXYLATE DERIVATIVES FOR USE IN SYNTHETIC MATERIALS, EMULSIONS AND SUSPENSIONS

This is a continuation of application Ser. No. 795,176, filed 11/5/85, now abandoned.

BACKGROUND OF THE INVENTION

1. Field of the Invention

The invention relates to a metal carboxylate derivative of a partially esterified α-olefin-unsaturated polycarboxylic acid copolymer and to the use of this compound as lubricant or stabilizer in synthetic materials and as emulsifier and/or suspending agent.

2. Description of the Prior Art

A metal carboxylate derivative of the type indicated above is known from U.S. Pat. No. 4,036,810, in which it is described as a stabilizer for chlorine-containing polymers. It is also mentioned as a lubricant for polyvinyl chloride.

Apparently, however, a considerable proportion of the carboxylates obtained by the process of said patent specification consist of compounds whose molecular weight is below 1000 and whose lubricating action is limited.

A metal carboxylate derivative of a partially esterified α-olefin-unsaturated polycarboxylic copolymer has now been found which is a surprisingly satisfactory internal and external lubricant for synthetic materials. This metal carboxylate derivative is characterized in that at least 80 percent by weight of the unesterified copolymer has a molecular weight in the range of from 1000 to 100,000.

It should be added that DE No. 2,727,329, DE No. 3,003,797 and DE No. 3,136,931 describe partially and wholly esterified α-olefin-unsaturated polycarboxylic acid copolymers, more particularly α-olefin-maleic acid copolymers suitable for use as lubricants. The present lubricants distinguish themselves from these copolymers by the presence of metal carboxylate groups, which results in a surprisingly satisfactory lubricating or stabilizing action. Reference is also made to EP No. 54,761, which claims a lubricant consisting of the salt of a copolymer of an α-β-ethylenically unsaturated acid and ethylene.

The invention also relates to the use of the present compounds as emulsifying and/or suspending agents and they are surprisingly effective as such. For instance, aqueous suspensions of clay can be more satisfactorily stabilized with these compounds than with carboxy methyl cellulose or copolymers from DE No. 3 136 931.

DETAILED DESCRIPTION OF THE INVENTION

As far as the metal carboxylate according to the invention is concerned, at least 80 percent by weight of the unesterified copolyester used in the preparation has a molecular weight in the range of from 1000 to 100,000. The average molecular weight is generally in the range of 1500 to 50,000, preferably 2000 to 30,000. The molecular weight of the copolymer is determined by gel permeation chromatography, as further described in Example 1.

The α-olefin used for the preparation of the copolymer contains 6 to 40 carbon atoms. It is preferred that the number of carbon atoms should be in the range of 10 to 24. Generally, the α-olefins used are mixtures of largely linear aliphatic hydrocarbons. Alternatively, however, the α-olefin may be branched and contain one or more cycloaliphatic, aromatic, ether, halogen, nitro, cyano, hydroxy, alkoxy, carbonyl and/or acid groups. Examples of these α-olefins include: hexene-1, octene-1, decene-1, dodecene-1, tetradecene-1, hexadecene-1, octadecene-1, eicosene-1, docosene-1, tetracosene-1, hexacosene-1, octacosene-1, tricontene-1, dotricontene-1, tetratricontene-1, 7-methyldecene-2, vinylcyclohexane, cyclohexyl-hexadecene-1, 5-(2-norbornyl)-nonadecene-1, phenyldocosene-1, hexyl allyl ether, 9-chlorononene-1, 5-methoxydecene-1, 8-ketotriadecene-1, 14-cyanopentadecene-1, 10-undecene carboxylic acid and 15-n-hexadecene carboxylic acid.

The co-monomer of the α-olefin is a derivative of an unsaturated polycarboxylic acid, more particularly a derivative of cis- or transethene dicarboxylic acid, such as a monoester of unsubstituted or monosubstituted ethene dicarboxylic acid, a metal maleate, or maleic anhydride. Of course, also mixtures of these compounds may be used. Examples of unsaturated polycarboxylic acid derivatives include: maleic anhydride, 2-chloromaleic anhydride, 2-methylmaleic anhydride, dioctyl tin maleate and the monomethyl, monobutyl, mono-2-ethylhexyl and monomethyldiglycol ester of maleic acid, fumaric acid, 2-chloromaleic acid, citraconic acid, mesaconic acid, itaconic acid and aconitic acid. It is preferred that use should be made of maleic anhydride.

The partially esterified α-olefin-unsaturated polycarboxylic acid copolymer is esterified with alcohols which may be linear, branched or cycloaliphatic and may contain one or more unsaturated bonds, ether groups, ester groups and/or aromatic groups. Alternatively, mixtures of alcohols may be used. When the present compounds are used as lubricants or stabilizers, the alcohol generally contains 1 to 40 carbon atoms, preferably 4 to 18 carbon atoms. When the present compounds are used as emulsifying and/or suspending agents, the alcohol is preferably a polyalkylene oxide glycol ether, more particularly a polyethylene oxide glycol ether with 1 to 50 ethylene oxide units, and more particularly with 1 to 30 ethylene oxide units.

Examples of suitable alcohols include: butanol, 2-ethylhexanol, talc alcohol, octadecanol, guerbet alcohol, diglycolethylene methyl ether, polyethylene glycol methyl ether, allyl alcohol, nonyl-phenol ethoxylate, benzyl alcohol.

The partially esterified α-olefin-unsaturated polycarboxylic acid copolymers are preferably esterified with 0.5 to 1.5 equivalents of alcohol, particularly with 0.8 to 1.2, and more particularly 1.0 equivalent of alcohol. The present compounds may contain all kinds of metals, such as metals from the groups Ia, IIa, IIb, IIIa and IVa of the Periodic System of the Elements. Particularly suitable for the present lubricants are barium, cadmium, calcium, magnesium, lead, tin and zinc. Also suitable are combinations of different metals, such as barium and zinc, and magnesium and zinc. For application as emulsifying and/or suspending agents use is preferably made of metals from the group Ia, particularly sodium or potassium.

In the preparation of the present metal carboxylate derivatives of partially esterified α-olefin-unsaturated polycarboxylic acid copolymers roughly three reaction steps may be distinguished, viz. copolymerization, esterification and formation of metal carboxylates. Copolymerization and esterification generally take place first.

The copolymerization is carried out in the presence of a radical initiator such as di-tert-butyl peroxide, benzoyl peroxide, dilauryl peroxide, dicumyl peroxide, tert. butyl hydroperoxide and/or cumyl hydroperoxide.

A process of the type indicated above is described in DE No. 2,727,329, DE No. 3,003,797 and DE No. 3,136,931.

The resulting polymers have a low oligomer content, which is in contrast to the products prepared in accordance with U.S. Pat. No. 4,036,810, which contain a large proportion of compounds, such as dimers and trimers, of a molecular weight below 1000.

In the copolymerization the amount of the reactants is preferably so chosen that the molar ratio of the $\alpha$-olefin to the polycarboxylic acid in the copolymer is in the range of 1:2 to 2:1. This can generally be achieved by choosing the ratio of the monomers to be used in the polymerization between 1:2 and 4:1.

Generally the formation of the metal carboxylate takes place in the last reaction stage by bringing the acid groups of the partially esterified $\alpha$-olefin-unsaturated polycarboxylic acid copolymer into reaction with a metal oxide, a metal hydroxide and/or a metal carbonate. Depending on the reaction conditions and the choice of the reactants free acid groups may remain in the ready product. This is for instance the case if the degree of esterification of the polycarboxylic acid is low. The viscosity of the reaction mixture will then readily become so high that the metal oxide, the metal hydroxide and/or the metal carbonate will be converted only to a limited extent. To ensure the presence in the end product of a considerable proportion of metal it is preferred that the ratio of metal carboxylate groups to acid groups should be higher than 0.5, more particularly higher than 0.1, preferably higher than 10. The end products may also contain more than one equivalent of metal oxide.

The invention also relates to the use of the present metal carboxylates of partially esterified $\alpha$-olefin unsaturated polycarboxylic acid copolymers as lubricants or stabilizers for synthetic materials and as emulsifying agents and/or suspending agents. Examples of synthetic materials in which the metal carboxylates may be used include polyvinyl chloride, chlorinated polyvinyl chloride, polymer compositions containing polyvinyl chloride, such as polyvinyl chloride-polyvinyl acetate, copolymers formed from vinyl chloride and other monomers, such as vinyl acetate, vinylidene chloride or acrylonitrile, and other polymers such as polyolefins, polystyrene and polyacrylates.

It is preferred that the present compounds should be used in chlorine-containing synthetic materials, more particularly polyvinyl chloride. These chlorine-containing materials are processed at elevated temperature and pressure. To permit rapid processing under these conditions while avoiding degradation of the polymer lubricants are added. On the one hand they serve to prevent excessive sticking to hot parts of the processing equipment (external lubrication) and on the other to reduce friction between the polymer particles (internal lubrication). Most lubricants either only display a good internal or a good external lubricating action, which necessitates the use of lubricant mixtures. The present metal carboxylates of partially esterified $\alpha$-olefin unsaturated polycarboxylic copolymers distinguish themselves by their excellent internal and external lubricating action and also have an unexpectedly good stabilizing effect on the polymer. Because of their high effectiveness the amount in which the present lubricants are to be used need only be small (usually less than 5, more particularly 0.1 to 2 parts per hundred), which has a favourable effect on the mechanical properties of the end product.

The excellent effectiveness as regards external lubrication manifests itself for instance in the long period the polymer can be milled without sticking to the metal mill rolls. Very often there is not even question of any excessive sticking for a long time after the stabilization period of the polymer. These properties make it possible for the processing equipment to be cleaned without any problems. Moreover, the present lubricants cause no or only very little "plating out" on the metal surface of the equipment.

The excellent internal lubricating effect appears from the short gelling times as measured with a Brabender Plasticorder. By aging tests carried out in an oven at elevated temperature the thermal stability of the polymer composition can be determined. The present metal carboxylate derivatives of partially esterified $\alpha$-olefin polycarboxylic acid copolymers are generally waxy or liquid and very suitable to be used in combination with stabilizers and/or other additives such as antioxidants, pigments, plasticizers, fillers, etc. Suitable PVC stabilizers are metal-containing compounds such as calcium soaps, barium soaps and zinc soaps, organotin compounds and lead salts, and organic costabilizers such as phosphites and $\beta$-diketones. It is very well possible to prepare such ready mixtures of the present metal carboxylates and other additives as are adapted to the processing of particular synthetic materials.

When the present copolymers are to be used as emulsifying and/or suspending agents, it is preferred that use should be made of those copolymers that are esterified with a polyethylene oxide glycol ether with 1 to 50, more particularly 1 to 30 ethylene oxide units and which contain as metal sodium and/or potassium. These compounds are suitable for many uses, such as the dispersion of, say, clay or pigments, the stabilization of lactices and as lubricating agents in high water based fluids.

The invention will be further described in the following examples.

EXAMPLE 1

(Copolymerization of $C_{18}$-$\alpha$-olefin and maleic anhydride)

A flask containing $C_{18}$-$\alpha$-olefin (756 g, 3 moles) was flushed with nitrogen and heated to 200° C. Subsequently, 10 equal portions of maleic anhydride (in all 294 g, 3 moles) and ditert-butyl peroxide (in all 15 ml) were added with stirring and at 30 minute intervals. After the addition over the next 1½ hours of 3 more portions of ditertbutyl peroxide (in all 4.5 ml) the mixture was heated to 200° C. for another 30 minutes, after which a small amount (about 15 g) of volatile constituents was distilled off by means of a water jet pump. By elementary analysis it was found that the ratio olefin:-maleic acid was 0.987. From a gel permeation chromatography analysis it appeared that the polymer had a broad molecular weight distribution and an average molecular weight of 2950, 92 percent of the product having a molecular weight in the range of from 1000 to 22,000. Yield 1045 g.

The copolymers described in Table I were prepared in the same manner.

The molecular weight of the unesterified copolymers was determined with the aid of a gel permeation chromatograph equipped with a micro-styragel column (Waters Associates, see firm bulletin A 143, June 1974) and a differential refractometer. The mobile phase consisted of tetrahydrofuran. For molecular weights below and above 3000 use was made of, respectively, polyethylene glycol and polystyrene calibrating materials. By the average molecular weight is to be understood the molecular weight at the main peak.

TABLE I

| | Preparation of α-olefin polycarboxylic acid copolymers | | | | | Preparation of half esters | | |
|---|---|---|---|---|---|---|---|---|
| Sample | α-olefin | mol. ratio reactants α-olefin: MA(1) | reaction temp.(2) (°C.) | ratio α-olefin: MA units in co-polymer | average molec-ular weight | perc. co-polymer with mol. weight of $10^3$–$10^5$ | alcohol | reaction temp. (°C.) |
| I | $C_6$ | 2 | 64 | 0.82 | 22600 | 87 | talc | 150 |
| II | $C_{14-16}$ | 1 | 200 | 1.0 | 2650 | 86 | PEGME(3) | 150 |
| III | $C_{14-16}$ | 0.5 | 200 | 0.55 | 3050 | 91 | talc | 150 |
| IV | $C_{18}$ | 1 | 200 | 0.99 | 2950 | 92 | talc | 150 |
| V | $C_{20-24}$ | 1 | 200 | 1.31 | 3750 | 92 | talc | 150 |
| VI | $C_{29-24}$ | 1 | 160 | — | 9150 | 80 | talc | 150 |
| VII | $C_{30}$ | 1 | 200 | — | 3000 | 89 | methyl | 70–120(4) |

(1)Maleic anhydride
(2)Reaction time 7 hours (sample I, 10,5 hours)
(3)Polyethylene glycol methyl ether (molecular weight 350)
(4)Temperature rises from 70° to 120° C.

EXAMPLE 2

(Preparation of the half ester from the $C_{18}$-α-olefin maleic anhydride copolymer)

The copolymer of Example 1 (300 g, containing 0.864 moles of maleic acid units) and talc alcohol (219 g, 0.864 moles) were stirred for 4 hours at 150° C.

Table I mentions several half esters that were prepared in the same way.

EXAMPLE 3

(Preparation of a calcium carboxylate derivative from the half ester of a $C_{18}$-α-olefin maleic anhydride copolymer)

The half ester from Example 2 (600 g, containing 1 mole of acid groups) and calcium hydroxide (37 g, 0.5 moles) were stirred for 1–5 hours at 110°–150° C., the calcium hydroxide being quantitatively converted and a clear viscous melt being formed.

Table II mentions several metal carboxylates prepared in a similar manner. Incomplete conversions of the metal oxide, metal hydroxide or metal carbonate were quantified by successively filtering, washing, drying and weighing unconverted metal oxide, metal hydroxide or metal carbonate.

TABLE II

| | Preparation of metal carboxylates | | | | |
|---|---|---|---|---|---|
| Sample | Copolymer | Average molecular weight of copolymer | Half ester | Metal carboxylate | Percentage acid groups converted into metal carboxylate groups |
| Ba-I | $C_6$/MA | 22600 | talc | Ba | 33 |
| Ba-II | $C_{14-16}$/MA | 2650 | PEGME[1] | Ba | 100 |
| Ca-II | $C_{14-16}$/MA | 2650 | talc | Ca | 100 |
| Ba-III | $C_{14-16}$/MA | 3050 | talc | Ba | 100 |
| Ba-IV | $C_{18}$/MA | 2950 | talc | Ba | 85 |
| Ca-IV | $C_{18}$/MA | 2950 | talc | Ca | 100 |
| Ba-V | $C_{20-24}$/MA | 2750 | talc | Ba | 100 |
| Pb-VI | $C_{20-24}$/MA | 9150 | talc | Pb | 88 |
| Ba-VII | $C_{30}$/MA | 3000 | methyl | Ba | 61 |

[1]polyethylene glycol methyl ether (molecular weight 350)

EXAMPLE 4

(Milling experiments)

In a dry blender the following compounds were premixed for 1 minute:

| | |
|---|---|
| S-PVC (K-70) | 100 parts |
| dioctylphthalate | 25 parts |
| lubricant | see Table III |
| stabilizer | see Table III |

The resulting compositions were mixed on a two-roll mill at 180° C.

| | |
|---|---|
| roll diameters | 110 and 125 mm |
| slit width between the rolls | 0.8 to 1 mm |
| roll speed | 20 rpm |

After about 1 minute a plastic mass was formed which, depending on the lubricant used, did or did not readily stick to the roll or did not stick to it at all (end of lubricating action). The results are given in Table III. They clearly show that the present lubricants are more effective than the commercially available lubricants: E-Wachs, Loxiol G 70 and Loxiol G 71.

Also the plating out of samples with the present lubricants is far less considerable, and the rolling skin did not stick to the roll for a long time after the end of the stabilization period.

TABLE III

| Lubricant | Parts of lubricant (min) | Duration of lubricant action |
|---|---|---|
| Ba-I | 0.5 | >>90 |
| Ba-II | 0.5 | 35 |
| Ba-III | 0.5 | 55 |
| Ba-IV | 0.5 | >70 |
| Ba-IV* | 2.0 | >>120 |
| Ba-V | 0.5 | 30 |
| Ba-V | 2.0 | 60 |
| Ba-VII | 0.5 | >160 |
| E-Wachs* | 0.5 | 0 |
| Loxiol G 70* | 0.5 | 10 |
| Loxiol G 71** | 0.5 | 18 |

*stabilized with 2.5 parts of dibutyltin dimonomethyl maleate
**stabilized with 2 parts of commercially available Ba—Zn stabilizer

EXAMPLE 5

(Brabender experiments)

In a dry blender the following compounds were premixed for 1 minute:

| | |
|---|---|
| S-PVC (K-70) | 100 parts |
| $PbSO_4$-4PbO | 1.5 parts |
| $Pb(C_{18}H_{35}COO)_2 2PbO$ | 1 part |
| lubricant | see Table IV |

An amount of 31 g of this mixture was tested in a Brabender at 25 rpm and at a temperature of 180° C.
The gelling times are mentioned in the table below.

TABLE IV

| Lubricant | Parts of lubricants | Gelling time (min) |
|---|---|---|
| Pb-VI | 0.5 | 1.5 |
| | 1.0 | 3.0 |
| | 1.5 | 7.1 |
| talc | 0.5 | 2.5 |
| alcohol | 1.0 | 3.9 |
| | 1.5 | 9.3 |

EXAMPLE 6

(Preparation of barium carboxylate and calcium carboxylate lubricants in accordance with U.S. Pat. No. 4,036,810)

In an autoclave a mixture of $C_{18}$-α-olefin (504 g, 2 moles) and maleic anhydride (98 g, 1 mole) was stirred for 44 hours at 185° C. Subsequently, 233 g (0.93 moles) of the $C_{18}$-α-olefin product were distilled off from the crude product mixture. The main product was the adduct of one molecule of α-olefin and one molecule of maleic anhydride and the residue contained 23 percent by weight of polymer of a molecular weight higher than 1000. In the way indicated in Example 2 the product mixture was converted with a talc alcohol into a half ester. The acid groups of the half ester were subsequently reacted with barium oxide or calcium oxide to be completely converted into the corresponding carboxylates (see Example 3).

EXAMPLE 7

(Milling experiments)

In the way described in Example 4 milling experiments were carried out with the following formulations:

| | |
|---|---|
| S-PVC (K-70) | 100 parts |
| dioctylphthalate | 25 parts |
| lubricant | 1.5 parts |

The results mentioned in Table V demonstrate that the present lubricants display a far better external lubricating action than corresponding compounds from U.S. Pat. No. 4,036,810 (see Example 6).

TABLE V

| Lubricant | Duration of lubricating action (min) |
|---|---|
| Ba-IV | >>120 |
| Ba-Example 6 | 25 |

EXAMPLE 8

(Brabender experiments)

In the way described in Example 5 Brabender experiments were conducted with the following formulations:

| | |
|---|---|
| S-PVC (K-68) | 100 parts |
| $PbSO_4$—4PbO | 1.5 parts |
| $Pb(C_{18}H_{36}O_2)_2 2PbO$ | 1 part |
| paraffin (melting point 60° C.) | 0.6 parts |
| lubricant to be tested | 0.6 parts |

The results mentioned in Table VI show that the present lubricants display a far better internal lubricating action than corresponding compounds from U.S. Pat. No. 4,036,810 (see Example 6).

TABLE VI

| Lubricant | Gelling time (min) |
|---|---|
| Ca-II | 1.8 |
| Ba-IV | 6.2 |
| Ca-IV | 2.1 |
| Ba-Example 6 | 10.0 |
| Ca-Example 6 | 16.5 |

EXAMPLE 9

(Milling experiments)

In the way described in Example 4 milling experiments were carried out with the following formulations:

| | |
|---|---|
| S-PVC (K-70) | 100 parts |
| dioctylphthalate | 2.5 parts |
| Ca/Zn-stabilizer (M330) | 1.2 parts |
| lubricant to be tested | 0.3 parts |

The following lubricants were tested: Mg-IV, Ba-IV; half ester-IV, ester-IV (the two last-mentioned compounds are the copolymers IV according to DE No. 2,727,329 and DE No. 3,003,797, respectively half and wholly esterified with talc alcohol).

The results given in Table VII illustrate that the present lubricants display a far better external lubricating action than the corresponding (half) ester copolymers.

TABLE VII

| Lubricant | Duration of lubricating action (min) |
| --- | --- |
| Mg-IV | >45 |
| Ba-IV | >40 |
| half ester-IV | 20 |
| ester-IV | 20 |

EXAMPLE 10

(Brabender tests)

In the way described in Example 5 Brabender tests were carried out with the following formulations:

| | |
| --- | --- |
| S-PVC (K-70) | 100 parts |
| Ca/Zn-stabilizer | 1.2 parts |
| lubricant to be tested | 0.6 parts |

The lubricants mentioned in Example 9 were tested. The gelling times are given in Table VIII. The results show that the present lubricants display a far better internal lubricating action than the (half) esters from DE No. 2,727,329 and DE No. 3,003,797.

TABLE VIII

| Lubricant | Gelling time (min) |
| --- | --- |
| Mg-IV | 2.4 |
| Ba-IV | 2.9 |
| half ester-IV | 4.6 |
| ester-IV | 17.5 |

EXAMPLE 11

(Oven aging)

In a dry blender the following compounds were pre-mixed:

| | |
| --- | --- |
| S-PVC (K-64) | 100 parts |
| dioctylphthalate | 25 parts |
| epoxidized soybean oil | 3 parts |
| Ba/Zn-stabilizer | 2 parts |

Three compositions were prepared, each containing a different amount of barium toluate or Ba-VIII (which is identical with Ba-II except that it is esterified with talc alcohol). See Table IX. The compositions A, B and C were mixed on a mill for 5 minutes at 172° C. and subsequently aged in a Werner Mathis oven at 185° C. until degradation of the PVC took place (recognizable by rapid discoloration).

All three compositions have the same metal content (0.17% Ba and 0.05% Zn).

The experiments show that PVC with the same metal content is better stabilized when use is made of the present metal carboxylates.

TABLE IX

| Composition | Ba-o-toluate (parts) | Ba-VIII (parts) | Stabilization time (min) |
| --- | --- | --- | --- |
| A | 0.50 | — | 72 |
| B | 0.45 | 0.16 | 87 |
| C | 0.40 | 0.31 | 93 |

EXAMPLE 12

(Use as suspending agent)

A copolymer built up from equivalent amounts of maleic anhydride and $C_{12-14}$-α-olefin and having a molecular weight of 20,000 was converted with polyethylene oxide glycol methyl ether (6-10 ethylene oxide units) into a half ester. The half ester (400 parts) readily dissolved in a solution of 14 parts of sodium hydroxide (100%) in water (586 parts). With the resulting sodium carboxylate derivative a suspension of clay in water was prepared by stirring the components for 10 minutes (stirring speed 100 rpm). The suspension was kept in a 100 ml-graduated cylinder for 24 hours at room temperature, after which 10 ml of the suspension was pipetted from the graduated cylinder at half height. After the water had been evaporated off at 105° C., the amount of suspended clay was determined by weighing. In reference experiments carboxymethyl cellulose and the half ester that had not been converted into a metal salt were used as suspending agents. The results in Table X illustrate the favourable suspending properties of the sodium carboxylate.

TABLE X

| Suspension | % solid matter in suspension* |
| --- | --- |
| 5% clay | 0 |
| 5% clay + 0.1% sodium carboxylate | 35 |
| 5% clay + 0.1% half ester | 25 |
| 5% clay + 0.1% carboxymethyl cellulose | 20 |

*based on amount weighed before evaporation

EXAMPLE 13

(Emulsion polymerization)

A 40%-dispersion of ethylene acrylate homopolymer in water was prepared by emulsion polymerization (initiator: potassium sulphate; polymerization temperature: 75° C.). Elfan ® OS 46 (sodium olefin sulphate) was used as the emulsifying agent in different amounts. In one experiment it was partly replaced with the potassium salt of the half ester copolymer mentioned in Example 12 (see Table XI). The various dispersions were mixed in a Star Mixer (which is similar to a Warring blender) for 2 minutes at 7500 rpm and subsequently filtered using an 0.2 mm stainless steel screen. The coagulate was dried at 110° C. and weighed.

The results show the excellent mechanical stability of the dispersions when using potassium carboxylate.

TABLE XI

| % stabillzer based on the polymer | | mechanical stability of the dispersion (% coagulate) |
| --- | --- | --- |
| Elfan OS 46 | potassium carboxylate | |
| 2 | | 17 |
| 4.5 | | 10 |
| 2 | 2.5 | 0.1 |

We claim:

1. A metal carboxylate of a partially esterified α-olefin unsaturated polycarboxylic acid copolymer, the α-olefin containing 6 to 40 carbon atoms and the copolymer being esterified with an alcohol, characterized in that one or more metals of said carboxylate are selected from group Ia of the Periodic Table of Elements, the ratio of the α-olefin to polycarboxylic units in the copolymer being in the range of from 1:2 to 2:1 and wherein at least 80 percent by weight of the unesterified copolymer has a molecular weight in the range of from 1000 to 100,000.

2. A metal carboxylate according to claim 1, characterized in that it is a derivative of a partially esterified α-olefin-ethylene dicarboxylic acid copolymer.

3. A metal carboxylate according to claim 1, characterized in that the copolymer is formed from an α-olefin and maleic anhydride.

4. A metal carboxylate according to claim 1, characterized in that the unesterified copolymer has an average molecular weight in the range of from 2000 to 30,000.

5. A metal carboxylate according to claim 1, characterized in that the α-olefin contains 10 to 24 carbon atoms.

6. A metal carboxylate according to claim 1, characterized in that the alcohol contains 1 to 40 carbon atoms.

7. A metal carboxylate according to claim 6, characterized in that the alcohol contains 4–18 carbon atoms.

8. A metal carboxylate according to claim 1, characterized in that the alcohol is a polyethylene oxide glycol ether with 1 to 50 ethylene oxide units.

9. A metal carboxylate according to claim 8, characterized in that the alcohol is a polyethylene oxide glycol ether with 1 to 30 ethylene oxide units.

10. A metal carboxylate according to claim 1, characterized in that the polycarboxylic acid units in the copolymer are esterified with 0.5 to 1.5 equivalents of alcohol.

11. A metal carboxylate according to claim 1, characterized in that the derivative contains one or more metals selected from the group consisting of barium, cadmium, calcium, magnesium, lead, tin and zinc.

12. A metal carboxylate according to claim 1, characterized in that the derivative contains sodium and/or potassium.

13. A metal carboxylate according to claim 1, characterized in that polycarboxylic acid units in the copolymer are esterified with 0.8 to 1.2 equivalents of alcohol.

* * * * *

UNITED STATES PATENT AND TRADEMARK OFFICE
CERTIFICATE OF CORRECTION

PATENT NO. : 4,775,723

DATED : October 4, 1988

INVENTOR(S) : Helmut KUHNE et al

It is certified that error appears in the above-identified patent and that said Letters Patent is hereby corrected as shown below:

On the cover page, in the ABSTRACT, line 10, after "resin" insert --such--.

Column 4, line 41, change "lactices" to --lattices--.

Signed and Sealed this

Twenty-eighth Day of March, 1989

Attest:

DONALD J. QUIGG

*Attesting Officer*  *Commissioner of Patents and Trademarks*

UNITED STATES PATENT AND TRADEMARK OFFICE

Certificate

Patent No. 4,775,723                                                          Patented: October 4, 1988

On petition requesting issuance of a cetificate for correction of inventorship pursuant to USC 256, it has been found that the above-identified patent, through error and without any deceptive intent, improperly sets forth the inventorship. Accordingly it is hereby certified that the correct inventorship of this patent is:
Helmut Kuhne and Heinz Beck.

Signed and Sealed this Sixth Day of March, 1990.

JOSEPH L. SCHOFER

*Supervisory Patent Examiner*
*Art Unit 155*